United States Patent
Filsfils et al.

(10) Patent No.: US 12,328,253 B2
(45) Date of Patent: *Jun. 10, 2025

(54) SCALABLE NETWORK SLICE BASED QUEUING USING SEGMENT ROUTING FLEXIBLE ALGORITHM

(71) Applicant: Cisco Technology, Inc., San Jose, CA (US)

(72) Inventors: Clarence Filsfils, Brussels (BE); Zafar Ali, Hicksville, NY (US); Pablo Camarillo Garvia, Madrid (ES); Francois Clad, Strasbourg (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/179,145

(22) Filed: Mar. 6, 2023

(65) Prior Publication Data
US 2023/0283568 A1     Sep. 7, 2023

Related U.S. Application Data

(63) Continuation of application No. 16/825,168, filed on Mar. 20, 2020, now Pat. No. 11,627,094, which is a
(Continued)

(51) Int. Cl.
*H04L 45/302*     (2022.01)
*H04L 41/12*      (2022.01)
(Continued)

(52) U.S. Cl.
CPC ............ *H04L 45/302* (2013.01); *H04L 41/12* (2013.01); *H04L 43/0888* (2013.01);
(Continued)

(58) Field of Classification Search
CPC ..... H04L 41/12; H04L 41/0803; H04L 47/10; H04L 43/0888; H04W 76/11; H04W 76/12
See application file for complete search history.

(56) References Cited

U.S. PATENT DOCUMENTS

| | | |
|---|---|---|
| 4,236,068 A | 11/1980 | Walton |
| 5,642,303 A | 6/1997 | Small et al. |

(Continued)

FOREIGN PATENT DOCUMENTS

| | | |
|---|---|---|
| WO | 2013020126 A1 | 2/2013 |
| WO | 2014098556 A1 | 6/2014 |

(Continued)

OTHER PUBLICATIONS

Afolabi I., et al., "Network Slicing & Softwarization: A Survey on Principles, Enabling Technologies Solutions," Mar. 21, 2018, pp. 1-24.
(Continued)

*Primary Examiner* — Raj Jain
(74) *Attorney, Agent, or Firm* — Polsinelli P.C.

(57) ABSTRACT

The present technology is directed to a system and method for implementing network resource partitioning and Quality of Service (QoS) separation through network slicing. Embodiments of the present invention describe scalable network slicing method based on defining Segment Routing Flexible Algorithm to represent a network slice and assigning a distinct QoS policy queue to each of the Flexible Algorithms configured on a network node. Therefore, scalable network slice based queuing is implemented wherein a single packet processing queue is assigned to each Flex-Algorithm based network slice. QoS policy queue may be implemented in a hierarchical fashion by differentiation
(Continued)

between flow packets in a single QoS policy queue based on value of experimental bits in the header.

20 Claims, 5 Drawing Sheets

Related U.S. Application Data continuation of application No. 16/178,418, filed on Nov. 1, 2018, now Pat. No. 10,601,724.

(51) Int. Cl.
  *H04L 43/0888* (2022.01)
  *H04L 47/10* (2022.01)
  *H04L 47/24* (2022.01)
  *H04L 47/6295* (2022.01)
  *H04L 47/70* (2022.01)
  *H04W 76/11* (2018.01)

(52) U.S. Cl.
  CPC ............. *H04L 47/10* (2013.01); *H04L 47/24* (2013.01); *H04L 47/6295* (2013.01); *H04L 47/70* (2013.01); *H04W 76/11* (2018.02)

(56) References Cited

U.S. PATENT DOCUMENTS

| | | | |
|---|---|---|---|
| 5,751,223 A | 5/1998 | Turner | |
| 6,812,824 B1 | 11/2004 | Goldinger et al. | |
| 7,006,472 B1 | 2/2006 | Innnnonen | |
| 7,177,295 B1* | 2/2007 | Sholander | H04W 40/26 370/338 |
| D552,603 S | 10/2007 | Tierney | |
| 7,573,862 B2 | 8/2009 | Chambers et al. | |
| 7,606,154 B1* | 10/2009 | Lee | H04L 47/30 370/232 |
| D637,569 S | 5/2011 | Desai et al. | |
| 7,975,262 B2 | 7/2011 | Cozmei | |
| 8,010,079 B2 | 8/2011 | Mia et al. | |
| 8,102,814 B2 | 1/2012 | Rahman et al. | |
| 8,260,320 B2 | 9/2012 | Herz | |
| 8,284,748 B2 | 10/2012 | Borghei | |
| 8,300,594 B1 | 10/2012 | Bernier et al. | |
| 8,325,626 B2 | 12/2012 | Toth et al. | |
| 8,396,485 B2 | 3/2013 | Grainger et al. | |
| 8,446,899 B2 | 5/2013 | Lei et al. | |
| 8,457,145 B2 | 6/2013 | Zimmerman et al. | |
| 8,458,184 B2 | 6/2013 | Dorogusker et al. | |
| D691,636 S | 10/2013 | Bunton | |
| 8,549,638 B2 | 10/2013 | Aziz | |
| 8,553,634 B2 | 10/2013 | Chun et al. | |
| 8,644,301 B2 | 2/2014 | Tamhankar et al. | |
| 8,650,279 B2 | 2/2014 | Mehta et al. | |
| 8,669,902 B2 | 3/2014 | Pandey et al. | |
| 8,676,182 B2 | 3/2014 | Bell et al. | |
| 8,682,279 B2 | 3/2014 | Rudolf et al. | |
| 8,693,367 B2 | 4/2014 | Chowdhury et al. | |
| 8,718,644 B2 | 5/2014 | Thomas et al. | |
| 8,761,174 B2 | 6/2014 | Jing et al. | |
| 8,768,389 B2 | 7/2014 | Nenner et al. | |
| 8,849,283 B2 | 9/2014 | Rudolf et al. | |
| 8,909,698 B2 | 12/2014 | Parmar et al. | |
| 8,958,318 B1 | 2/2015 | Hastwell et al. | |
| 9,060,352 B2 | 6/2015 | Chan et al. | |
| 9,130,859 B1 | 9/2015 | Knappe | |
| 9,173,084 B1 | 10/2015 | Foskett | |
| 9,173,158 B2 | 10/2015 | Varma | |
| D744,464 S | 12/2015 | Snyder et al. | |
| 9,270,709 B2 | 2/2016 | Shatzkamer et al. | |
| 9,271,216 B2 | 2/2016 | Friman et al. | |
| 9,281,955 B2 | 3/2016 | Moreno et al. | |
| D757,424 S | 5/2016 | Phillips et al. | |
| D759,639 S | 6/2016 | Moon et al. | |
| 9,369,387 B2 | 6/2016 | Filsfils et al. | |
| 9,389,992 B2 | 7/2016 | Gataullin et al. | |
| 9,426,305 B2 | 8/2016 | De et al. | |
| D767,548 S | 9/2016 | Snyder et al. | |
| 9,467,918 B1 | 10/2016 | Kwan | |
| D776,634 S | 1/2017 | Lee et al. | |
| 9,544,337 B2 | 1/2017 | Eswara et al. | |
| 9,569,771 B2 | 2/2017 | Lesavich et al. | |
| 9,609,504 B2 | 3/2017 | Karlqvist et al. | |
| 9,615,268 B2 | 4/2017 | Navarro et al. | |
| 9,634,952 B2 | 4/2017 | Gopinathan et al. | |
| 9,642,167 B1 | 5/2017 | Snyder et al. | |
| 9,654,344 B2 | 5/2017 | Chan et al. | |
| 9,712,444 B1 | 7/2017 | Bolshinsky et al. | |
| 9,713,114 B2 | 7/2017 | Yu | |
| 9,736,056 B2 | 8/2017 | Vasseur et al. | |
| 9,762,683 B2 | 9/2017 | Karampurwala et al. | |
| 9,772,927 B2 | 9/2017 | Gounares et al. | |
| 9,820,105 B2 | 11/2017 | Snyder et al. | |
| D804,450 S | 12/2017 | Spiel et al. | |
| 9,858,559 B2 | 1/2018 | Raleigh et al. | |
| 9,860,151 B2 | 1/2018 | Ganichev et al. | |
| 9,923,780 B2 | 3/2018 | Rao et al. | |
| 9,933,224 B2 | 4/2018 | Dorne et al. | |
| 9,961,560 B2 | 5/2018 | Farkas et al. | |
| 9,967,906 B2 | 5/2018 | Verkaik et al. | |
| 9,980,220 B2 | 5/2018 | Snyder et al. | |
| 9,985,837 B2 | 5/2018 | Rao et al. | |
| 9,998,368 B2 | 6/2018 | Chen et al. | |
| 10,601,724 B1* | 3/2020 | Filsfils | H04L 47/70 |
| 11,627,094 B2* | 4/2023 | Filsfils | H04L 43/0888 370/235 |
| 2002/0016937 A1* | 2/2002 | Houh | H04M 3/244 714/43 |
| 2002/0095498 A1* | 7/2002 | Chanda | H04Q 11/04 709/225 |
| 2002/0097674 A1 | 7/2002 | Balabhadrapatruni et al. | |
| 2003/0087645 A1 | 5/2003 | Kim et al. | |
| 2003/0116634 A1 | 6/2003 | Tanaka | |
| 2004/0177087 A1* | 9/2004 | Wu | H04L 47/245 707/999.102 |
| 2004/0203572 A1 | 10/2004 | Aerrabotu et al. | |
| 2005/0090225 A1 | 4/2005 | Muehleisen et al. | |
| 2005/0169193 A1 | 8/2005 | Black et al. | |
| 2005/0186904 A1 | 8/2005 | Kowalski et al. | |
| 2006/0022815 A1 | 2/2006 | Fischer et al. | |
| 2006/0030290 A1 | 2/2006 | Rudolf et al. | |
| 2006/0092964 A1 | 5/2006 | Park et al. | |
| 2006/0126882 A1 | 6/2006 | Deng et al. | |
| 2006/0187866 A1 | 8/2006 | Werb et al. | |
| 2007/0037605 A1 | 2/2007 | Logan | |
| 2007/0239854 A1 | 10/2007 | Janakiraman et al. | |
| 2007/0291791 A1 | 12/2007 | English et al. | |
| 2008/0037715 A1 | 2/2008 | Prozeniuk et al. | |
| 2008/0084888 A1 | 4/2008 | Yadav et al. | |
| 2008/0101381 A1 | 5/2008 | Sun et al. | |
| 2008/0163207 A1 | 7/2008 | Reumann et al. | |
| 2008/0233969 A1 | 9/2008 | Mergen | |
| 2009/0129389 A1 | 5/2009 | Halna Defretay et al. | |
| 2009/0203370 A1 | 8/2009 | Giles et al. | |
| 2009/0282048 A1 | 11/2009 | Ransom et al. | |
| 2009/0298511 A1 | 12/2009 | Paulson | |
| 2009/0307485 A1 | 12/2009 | Weniger et al. | |
| 2010/0039280 A1 | 2/2010 | Holm et al. | |
| 2010/0097969 A1 | 4/2010 | De Kimpe et al. | |
| 2011/0087799 A1 | 4/2011 | Padhye et al. | |
| 2011/0142053 A1 | 6/2011 | Van Der Merwe et al. | |
| 2011/0182295 A1 | 7/2011 | Singh et al. | |
| 2011/0194553 A1 | 8/2011 | Sahin et al. | |
| 2011/0228779 A1 | 9/2011 | Goergen | |
| 2012/0023552 A1 | 1/2012 | Brown | |
| 2012/0054367 A1 | 3/2012 | Ramakrishnan et al. | |
| 2012/0088476 A1 | 4/2012 | Greenfield | |
| 2012/0115512 A1 | 5/2012 | Grainger et al. | |
| 2012/0157126 A1 | 6/2012 | Rekimoto | |
| 2012/0167207 A1 | 6/2012 | Beckley et al. | |
| 2012/0182147 A1 | 7/2012 | Forster | |
| 2012/0311127 A1 | 12/2012 | Kandula et al. | |
| 2012/0324035 A1 | 12/2012 | Cantu et al. | |

(56) References Cited

U.S. PATENT DOCUMENTS

| | | |
|---|---|---|
| 2013/0029685 A1 | 1/2013 | Moshfeghi |
| 2013/0039391 A1 | 2/2013 | Skarp |
| 2013/0057435 A1 | 3/2013 | Kim |
| 2013/0077612 A1 | 3/2013 | Khorami |
| 2013/0088983 A1 | 4/2013 | Pragada et al. |
| 2013/0107853 A1 | 5/2013 | Pettus et al. |
| 2013/0108263 A1 | 5/2013 | Srinivas et al. |
| 2013/0115916 A1 | 5/2013 | Herz |
| 2013/0145008 A1 | 6/2013 | Kannan et al. |
| 2013/0155906 A1 | 6/2013 | Nachum et al. |
| 2013/0191567 A1 | 7/2013 | Rofougaran et al. |
| 2013/0203445 A1 | 8/2013 | Grainger et al. |
| 2013/0217332 A1 | 8/2013 | Altman et al. |
| 2013/0232433 A1 | 9/2013 | Krajec et al. |
| 2013/0273938 A1 | 10/2013 | Ng et al. |
| 2013/0317944 A1 | 11/2013 | Huang et al. |
| 2013/0322438 A1 | 12/2013 | Gospodarek et al. |
| 2013/0343198 A1 | 12/2013 | Chhabra et al. |
| 2013/0347103 A1 | 12/2013 | Veteikis et al. |
| 2014/0007089 A1 | 1/2014 | Bosch et al. |
| 2014/0016926 A1 | 1/2014 | Soto et al. |
| 2014/0025770 A1 | 1/2014 | Warfield et al. |
| 2014/0031031 A1 | 1/2014 | Gauvreau et al. |
| 2014/0052508 A1 | 2/2014 | Pandey et al. |
| 2014/0059655 A1 | 2/2014 | Beckley et al. |
| 2014/0087693 A1 | 3/2014 | Walby et al. |
| 2014/0105213 A1 | 4/2014 | Ak et al. |
| 2014/0118113 A1 | 5/2014 | Kaushik et al. |
| 2014/0148196 A1 | 5/2014 | Bassan-Eskenazi et al. |
| 2014/0179352 A1 | 6/2014 | V.M. et al. |
| 2014/0191868 A1 | 7/2014 | Ortiz et al. |
| 2014/0198808 A1 | 7/2014 | Zhou |
| 2014/0222997 A1 | 8/2014 | Mermoud et al. |
| 2014/0233460 A1 | 8/2014 | Pettus et al. |
| 2014/0269321 A1 | 9/2014 | Kamble et al. |
| 2014/0302869 A1 | 10/2014 | Rosenbaum et al. |
| 2014/0337824 A1 | 11/2014 | St. John et al. |
| 2014/0341568 A1 | 11/2014 | Zhang et al. |
| 2015/0016286 A1 | 1/2015 | Ganichev et al. |
| 2015/0016469 A1 | 1/2015 | Ganichev et al. |
| 2015/0023176 A1 | 1/2015 | Korja et al. |
| 2015/0030024 A1 | 1/2015 | Venkataswami et al. |
| 2015/0043581 A1 | 2/2015 | Devireddy et al. |
| 2015/0063166 A1 | 3/2015 | Sif et al. |
| 2015/0065161 A1 | 3/2015 | Ganesh et al. |
| 2015/0087330 A1 | 3/2015 | Prechner et al. |
| 2015/0103818 A1 | 4/2015 | Kuhn et al. |
| 2015/0163192 A1 | 6/2015 | Jain et al. |
| 2015/0172391 A1 | 6/2015 | Kasslin et al. |
| 2015/0223337 A1 | 8/2015 | Steinmacher-Burow |
| 2015/0256972 A1 | 9/2015 | Markhovsky et al. |
| 2015/0264519 A1 | 9/2015 | Mirzaei et al. |
| 2015/0280827 A1 | 10/2015 | Adiletta et al. |
| 2015/0288410 A1 | 10/2015 | Adiletta et al. |
| 2015/0326704 A1 | 11/2015 | Ko et al. |
| 2015/0358777 A1 | 12/2015 | Gupta |
| 2015/0362581 A1 | 12/2015 | Friedman et al. |
| 2016/0007315 A1 | 1/2016 | Lundgreen et al. |
| 2016/0044627 A1 | 2/2016 | Aggarwal et al. |
| 2016/0099847 A1 | 4/2016 | Melander et al. |
| 2016/0100395 A1 | 4/2016 | Xu et al. |
| 2016/0105408 A1 | 4/2016 | Cooper et al. |
| 2016/0127875 A1 | 5/2016 | Zampini, II |
| 2016/0146495 A1 | 5/2016 | Malve et al. |
| 2016/0234105 A1 | 8/2016 | Li et al. |
| 2016/0330045 A1 | 11/2016 | Tang et al. |
| 2016/0344641 A1 | 11/2016 | Javidi et al. |
| 2017/0026974 A1 | 1/2017 | Dey et al. |
| 2017/0054595 A1 | 2/2017 | Zhang et al. |
| 2017/0180999 A1 | 6/2017 | Alderfer et al. |
| 2017/0181136 A1 | 6/2017 | Bharadwaj et al. |
| 2017/0195205 A1 | 7/2017 | Li et al. |
| 2017/0202000 A1 | 7/2017 | Fu et al. |
| 2017/0214551 A1 | 7/2017 | Chan et al. |
| 2017/0257870 A1 | 9/2017 | Farmanbar et al. |
| 2017/0273083 A1 | 9/2017 | Chen et al. |
| 2017/0317997 A1 | 11/2017 | Smith et al. |
| 2017/0318468 A1 | 11/2017 | Aijaz |
| 2017/0332421 A1 | 11/2017 | Sternberg et al. |
| 2017/0339706 A1 | 11/2017 | Andreoli-Fang et al. |
| 2018/0063018 A1 | 3/2018 | Bosch et al. |
| 2018/0069311 A1 | 3/2018 | Pallas et al. |
| 2018/0084389 A1 | 3/2018 | Snyder et al. |
| 2018/0262585 A1 | 9/2018 | Zandi et al. |
| 2018/0270743 A1 | 9/2018 | Callard et al. |
| 2018/0309678 A1* | 10/2018 | Dillon ................ H04L 61/4511 |
| 2018/0367432 A1 | 12/2018 | Cociglio et al. |
| 2019/0068517 A1* | 2/2019 | Chen ...................... H04L 43/18 |
| 2019/0289647 A1* | 9/2019 | Li .......................... H04L 41/122 |
| 2020/0127948 A1* | 4/2020 | Jung ...................... G06F 9/445 |
| 2020/0244588 A1* | 7/2020 | Filsfils .................... H04L 41/12 |
| 2023/0283568 A1* | 9/2023 | Filsfils ................ H04L 43/0888 |
| | | 370/235 |

FOREIGN PATENT DOCUMENTS

| | | |
|---|---|---|
| WO | 2015131920 A1 | 9/2015 |
| WO | 2017078657 A1 | 5/2017 |
| WO | 2017187011 A1 | 11/2017 |
| WO | 2017202334 | 11/2017 |
| WO | 2018009340 A1 | 1/2018 |
| WO | 2018028777 A1 | 2/2018 |
| WO | 2018053271 A1 | 3/2018 |
| WO | 2018066362 A1 | 4/2018 |

OTHER PUBLICATIONS

Ali Z., et al., "Performance Measurement in Segment Routing Networks with IPv6 Data Plane (SRv6); draft-ali-spring-srv6-pm-01.txt," Spring Working Group, Feb. 26, 2018, pp. 1-17.

An X., et al., "Virtualization of Cellular Network EPC Gateways based on a Scalable SDN Architecture," IEEE, Feb. 12, 2015, pp. 1-7.

Antonioli R.P., et al., "Dual Connectivity for LTE-NR Cellular Networks," Research Gate, Sep. 3-6, 2017, pp. 171-175.

Bekan A., et al., "D5.1: Machine Learning Algorithms Development and Implementation," 2016-2018 eWINE Consortium, 23, 2016, pp. 1-72.

Blogspot "I Love WiFi, The Difference between L2 and L3 Roaming Events," Apr. 1, 2010, 6 Pages, Retrieved from URL: http://jenniferhuber.blogspot.com/2010/04/difference-between-l2-and-l3-roaming.html.

Bogale T.E., et al., "Machine Intelligence Techniques for Next-Generation Context-Aware Wireless Networks," arxiv.org, Jan. 12, 2018, pp. 1-10.

Carter S.Sr., "E911 VoIP Essentials for Enterprise Deployments," XO Communications, LLC, 2012, 9 pages.

Chalise B.K., et al., "MIMO Relaying for Multiaccess Communication in Cellular Networks," Sensor Array and Multi Channel Signal Processing Workshop, 5th IEEE, Jul. 21, 2008, pp. 146-150.

Cheng W., et al., "Path Segment in MPLS Based Sement Routing Network; draft-cheng-spring-mpls-path-segment-00," Network Working Group, Oct. 2017, pp. 1-10.

Christidis K., et al., "Blockchains and Smart Contracts for the Internet of Things," IEEE Access, Special Section on the Plethora of Research in Internet of Things (IoT), May 10, 2016, pp. 2292-2303.

Cisco 10000 Series Router Quality of Service Configuration Guide, "Chapter 20: Configuring Quality of Service for MPLS Traffic," Cisco Systems, Inc., Updated Nov. 17, 2013, pp. 1-34.

Cisco "ASR 5x00 Mobility Management Entity Administration Guide," Version 15.0, Cisco, Last Updated Jun. 13, 2014, 266 Pages.

Cisco Systems, Inc., "Wi-Fi Location-Based Services 4.1 Design Guide," May 20, 2008, 206 Pages.

Cox J.H.Jr., et al., "Advancing Software-Defined Networks: A Survey," IEEE Access, Publication date Oct. 12, 2017, vol. 5, pp. 25487-25526.

(56) References Cited

OTHER PUBLICATIONS

Cui W., et al., "DiFS: Distributed Flow Scheduling for Data Center Networks," Nanjing University, China, Jul. 28, 2013, 10 Pages.
De Sousa N.F.S., et al., "Network Service Orchestration: A Survey," IEEE Communications Surveys Tutorials, Mar. 23, 2018, 30 Pages.
Doyle M.G., "An IP Address Management Solution for a Server Solution Provider," A Dissertation Submitted to The University of Liverpool, Sep. 28, 2005, 116 Pages.
Enterprise Mobility 7.3 Design Guide, "Chapter 11: Cisco Mobility Services Engine," Cisco Systems, Inc., Updated Apr. 20, 2015, 8 pages.
Galvan T.C.E., et al., "Wifi Bluetooth Based Combined Positioning Algorithm," International Meeting of Electrical Engineering Research ENIINVIE 2012, Procedia Engineering, 2012, vol. 35, pp. 101-108.
Geller M., et al., "5G Security Innovation with Cisco," Whitepaper Cisco Public, Jun. 8, 2018, pp. 1-29.
Gesbert D., "Advances in Multiuser MIMO Systems (Tutorial Part II) Emerging Topics in Multiuser MIMO Networks," IEEE PIMRC Conference, Sep. 2007, 107 Pages.
Halperin D., et al., "Augmenting Data Center Networks with Multi-Gigabit Wireless Links," SIGCOMM'11, Aug. 15-19, 2011, ACM978-1-4503-0797-Jan. 11, 2008, pp. 38-49.
Hsieh C., "Location Awareness in VMware View 4.5 and Above," VMware, Information Guide, 2011, 8 Pages.
Husain S., et al., "Mobile Edge Computing with Network Resource Slicing for Internet-of-Things," IEEE, 2017, 7 Pages.
International Preliminary Report on Patentability for International Application No. PCT/US2019/057322, mailed May 14, 2021, 9 Pages.
International Search Report and Written Opinion from the International Searching Authority, mailed Dec. 6, 2019, 10 pages, for corresponding International Patent Application No. PCT/US2019/057322.
Jero S., et al., "Identifier Binding Attacks and Defenses in Software-Defined Networks," USENIX, The Advanced Computing Systems Association, Aug. 16-18, 2017, 19 Pages.
Ji P.N., et al., "Demonstration of High-Speed MIMO OFDM Flexible Bandwidth Data Center Network," Optical Society of America, 2012, 2 Pages.
Kandula S., et al., "Flyways to De-Congest Data Center Networks," Microsoft Research, Oct. 23, 2009, 6 Pages.
Katayama Y. et al., "MIMO Link Design Strategy for Wireless Data Center Applications," IEEE Wireless Communications and Networking Conference: Services, Applications, and Business, 2012, 5 pages.
Leary J., et al., "Wireless LAN Fundamentals: Mobility | Characteristics of Roaming," Ciscopress.com, Jan. 9, 2004, 15 pages.
Leonhardt U., "Supporting Location-Awareness in Open Distributed Systems," Department of Computing Imperial College of Science, Technology and Medicine University of London, May 1998, 186 Pages.
Morozov Y., "BubbleTone Blockchain: Global Telecom Ecosystem Without Intermediaries: Smart Contracts Allow Direct Interaction between Mobile Operators, Subscribers and Service Providers," Blockchain Telecom, Dec. 29, 2017, pp. 1-33.
Network Heresy, "NVGRE, VXLAN and What Microsoft is Doing Right," Network Virtualization, Open vSwitch, Oct. 3, 2011, 5 pages.
Norwegian National Security Authority, "N-03 Security Guidance for Switches and Routers," Guidance on Network Security to Comply with the NSM Information Security Directive, Sep. 26, 2012, 24 Pages.
Regulatory & Market Environment, "Quality of Service Regulation Manual," ITU, 2017, pp. 1-176.
Savvides A., et al., "Dynamic Fine-Grained Localization in Ad-Hoc Networks of Sensors," Proceeding MobiCom '01 Proceedings of the 7th Annual International Conference on Mobile Computing and Networking, Jul. 2001, pp. 166-179.
Shwetha D., et al., "A Bandwidth Request Mechanism for QoS Enhancement in Mobile WiMAX Networks," International Journal of Advanced Research in Electrical Electronics and Instrumentation Engineering, Jan. 2014, vol. 3, No. 1, 8 Pages.
Sun, et al., "The Future of Wi-Fi," IEEE Communications Magazine, Nov. 21, 2014, vol. 52, No. 11, 166 Pages.
Ventre P.L., et al., "Performance Evaluation and Tuning of Virtual Infrastructure Managers for (Micro) Virtual Network Functions," IEEE, Nov. 7-10, 2016, 7 Pages.
Wright J., "Detecting Wireless LAN MAC Address Spoofing," Jan. 21, 2003, pp. 1-20.
Zickau S., et al., "Enabling Location-based Policies in a Healthcare Cloud Computing Environment," 2014 IEEE 3rd International Conference on Cloud Networking (Cloudnet), Oct. 2014, pp. 353-358.

* cited by examiner

SCALABLE NETWORK SLICE BASED QUEUING USING SEGMENT ROUTING FLEXIBLE ALGORITHM

CROSS-REFERENCE TO RELATED APPLICATION

This application is a continuation of U.S. patent application Ser. No. 16/825,168, filed on Mar. 20, 2020, which in turn, is a continuation of U.S. patent application Ser. No. 16/178,418 filed on Nov. 1, 2018, now granted U.S. Pat. No. 10,601,724, the contents of which are incorporated by reference in their entirety.

TECHNICAL FIELD

The present technology pertains to resource partitioning and quality of service (QoS) separation. More specifically it is directed to scalable implementation of logical network slicing in segment routing based networks.

BACKGROUND

Quality of Service mechanism ensures that the applications with the highest priority have priority treatment. As part of a resource allocation mechanisms, each network node (i.e. router) must implement some queuing discipline that governs how packets are buffered while waiting to be processed and/or transmitted. Processing of traffic flows based on prescribed Quality of Service policies may be facilitated by assigning incoming/outgoing packets to designated queues with a set of corresponding QoS specifications. For example, text, voice and multimedia services are typically associated with different QoS parameters and as such may be assigned to and processed via different queues. Network resources may then be properly allocated to different flows in accordance to associated QoS parameters.

However, the increasing diversity of emerging networking applications and resulting traffic flows with more and more diverse characteristics for transport over the Internet (e.g., http, p2p, audio and video streaming, e-mail, ftp, etc.) necessitates up-scaling of conventional implementation. Moreover, the aforementioned various traffic types require different treatment from the carrier network to finally meet the Quality of Experience requirements of the end users. As such networks have become, and will continue to be subject to a manifold of technical and service requirements with respect to throughput, latency, reliability, availability, as well as operational requirements such as energy and cost efficiency. The dire need to accommodate such level of diversity and the ever increasing expectations of the users necessitates architectures that can accommodate low overhead and highly scalable traffic differentiation and Quality of Service (QoS) guarantees for the data traffic carried across the network.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Figure 1:
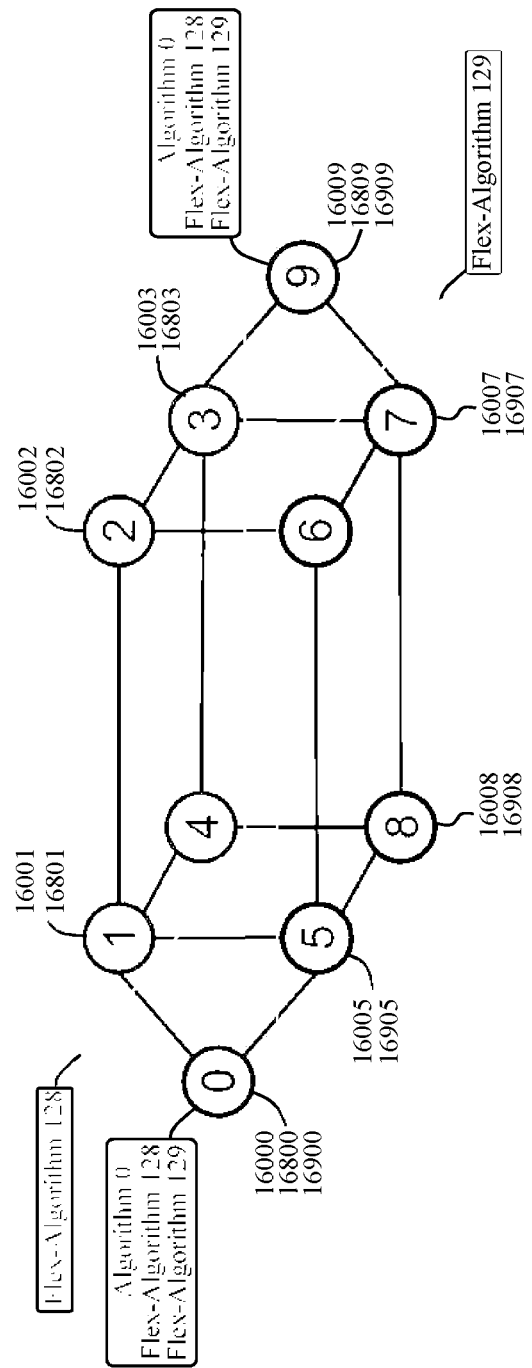
FIG. 1 illustrates a network slicing implemented on the basis of Segment Routing Flexible-algorithm, in accordance to some embodiment of the present technology.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein

Overview

Systems and methods, are disclosed for implementing scalable network slice based traffic differentiation by using the Flexible-Algorithm feature of Segment Routing protocol. Described method, according to some embodiments, comprise a step of associating one or more QoS policy queues to one or more Segment Routing Algorithms configured on a network node, wherein each of the one or more QoS policy queues is assigned to a different Segment Routing Algorithm. The embodiment further comprise a step of assigning flow packets associated with each of the one or more Segment Routing Algorithms to the QoS policy queue associated with each of the Segment Routing Algorithm. The embodiment further comprise a step of pointing all of one or more forwarding entries specific to each of the one or more Segment Routing Algorithms configured on the network node, towards the associated QoS policy queue. Segment Routing Algorithm may be predefined or it may be a Flexible-Algorithm associated with an operator-provided definition. Hierarchical implementation of QoS policy queues, according to some embodiments, involves differentiating between flow packets based on experimental bit (EXP) setting in a packet header. Thereby creating EXP bit based sub queues within each Flexible-Algorithm based QoS policy queue. In the described system a controller entity may be set to monitor the depth of QoS policy queues implemented in accordance to some embodiments. The depth of the queue serves as indication of the size of the network slice (degree of network resource utilization) and may be used in context of routine analytics to provide notifications if the network slice is running out of capacity.

Example Embodiments

Disclosed are systems, methods, and non-transitory computer-readable storage media for scalable namespace based VPN headend deployment with customer context awareness to facilitate a granular application of security policies by the upstream cloud services. Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The standard mechanism for determining the best end to end forwarding path through the network is the Interior Gateway Protocol (IGP) which performs the (shortest) path computation based on the IGP metric assigned to the interconnecting links. If a particular traffic flow generated by an application program, has traffic requirements which are not reflected in the IGP metric, then the traffic flow must be instead routed over one or more traffic engineered path configured to fulfill the corresponding traffic requirements. Some networks engineer the IGP metric assignments to reflects the link bandwidth or delay. If, for example, the IGP metric is reflecting the bandwidth on the link and the application traffic is delay sensitive, the best IGP path may not reflect the best path from such application's perspective.

To overcome such IGP limitation, various sorts of traffic engineering, such as Resource Reservation Traffic Engineering (RSVP-TE) have been conventionally deployed. However, with the advent of Software Defined Networking (SDN) an emerging solution for network resource segmentation and differentiated service delivery has been the creation of independent logical network slice overlays built on top of common physical infrastructure. In this way different applications communicating over different network slice may be provided with a different Quality of Service treatment. As such, traffic engineered paths are provided to meet specific performance requirements of different application types or different clients requirements and business needs. These traffic engineered paths may be regarded as logical network slice overlays existing on top of the underlying physical infrastructure and providing application and/or client specific services.

Network slicing allows the support of logical autonomous networks on top of a common infrastructure, thus offering a customized networking experience for addressing distinct business demands. A network slice is a logical end-to-end overlay network dynamically/statically created over a physical infrastructure. Network slicing facilitates assignment of different slices for different service types. For example, voice over IP traffic maybe assigned to set of network slices that better reflect the performance requirement of this type of traffic, whereas on-demand video streaming traffic maybe configured to propagate over a different set of network slices that offer performance characteristics that are more conducive to that traffic type. Similarly, this method of network resource segmentation may apply to differentiating specific customer traffic by assigning it its own network slice(s) and configuring the slice(s) in accordance to requirement of the customer.

A promising scheme for implementation and provisioning of network slices is Segment Routing Traffic Engineering (SR-TE), wherein the Traffic Engineering component is responsible for computing the path based on additional metrics and/or constraint. In this way, Segment Routing offers support for creating autonomous logical network slices on top of a common infrastructure. These logical networks amount to isolated network slices offering different customized networking experience to address distinct business demands.

In essence Segment Routing provides scalable source routing capability based on segment identifiers that may be distributed by the existing Interior Gateway Protocols. The source/originator node (ingress) chooses a path and encodes it in the packet header as an ordered list of segments. The forwarding path of the packet is therefore determined by prepended segment identifiers. As such the rest of the network executes encoded instruction without any further per-flow state (network fabric does not hold any Traffic Engineering state per each traffic flow).

A segment may be regarded as a particular forwarding instruction (i.e., topological or service related) identified by a segment identifier (SID). For example a Segment may represent the instruction: Go to Node 'C' using the shortest path or alternatively it may represent the instruction: Go to node 'D' over the shortest path to node 'C' and then follow specified links layer to 'P' or Apply service S. Forwarding paths associated with different network slices may be installed in the forwarding table of participating network nodes to replace the original paths computed by IGPs. Tunnels may be used to represent the engineered paths used to replace or enhance/augment the native IGP paths.

In general, a key challenge in network slicing may be the implementation of a flexible yet robust scheme for partitioning network resources among various network slices over the common infrastructure. Some solutions provide a hard partitioning that is too rigid to implement a flexible pay as you grow model which may be an attractive option from a client perspective. Some other solutions provide soft partitioning without proper resource and Quality of Service separation among slices.

The foregoing challenges is addressed by embodiments of the present technology which describe a solution that provide resource partitioning and Quality of Service (QoS) separation among network slices while enabling the service provider to build a "pay as you grow" business model. In the described embodiments, for example, an overload of high priority traffic on one slice does not affect high priority services offered on another slice, and vice versa.

Many possible constraints may be used to compute a path over a network. Some networks are deployed as multiple planes. A simple form of constraint may be to use a particular plane. More sophisticated form of constraint can include an extended set of metrics and constraints which restrict paths to links with specific affinities or avoid links with specific affinities. Combinations of these are also possible. Implementing a strict mapping between a set of constraints and the associated (forwarding) algorithm may not be conducive to providing a more flexible network slicing solution. As such, it may be advantageous for the mapping between the Segment Routing algorithm value and its meaning to be flexible and defined by the user. The forwarding path computation for such user defined algorithm will remain consistent and traffic will not be subject to looping as long as all the routers in the Segment Routing domain have a common understanding of what a particular algorithm value represents. The Segment Routing feature that enables the meaning of an algorithm to be provided by the user instead of a predefined standard, is sometimes referred to as Flexible-Algorithm (Flex-Algorithm).

Flexible Algorithm complements the Segment Routing based Traffic Engineering solution by adding new Prefix/ Node Segments with specific optimization objectives and constraints. For example forwarding instruction may be defined based on minimization of IGP metric, delay or some other Traffic Engineering metric as well as avoidance of Shared Risk Link Groups or links with specific affinities).

Each Prefix—SID (Node SID) is associated with a (flexible) forwarding algorithm and each node advertises its algorithm support capabilities. In this way Segment Routing Flexible Algorithm allows for a flexible definition of end-to-end paths within IGP topologies by encoding paths as sequences of topological sub-paths, called segments. Segment Routing (Flexible) Algorithm also defines how the paths are computed. Thus enabling the existing Interior Gateway Protocols to compute forwarding paths based on various algorithms and steer traffic onto such paths using the algorithm specific segments (forwarding instructions).

A starting point in the operation of a Flexible Algorithm may be identified as the instance when a network operator enables the participation of specific network nodes for a specific flexible algorithm and then provisions the definition of that flexible algorithm on one or more network nodes. A segment routing underlay node on which one or more Flexible Algorithms are enabled will advertise its participation in the respective Flexible-Algorithm(s) by advertising a different Prefix-SID for each Flexible Algorithm that it supports.

A Prefix-SID advertisement, in addition to announcing the IGP Prefix of the advertising node, also encodes a Segment Routing Algorithm with which it is associated. The nodes where the Flexible Algorithm definition is advertised then flood these definitions via respective Interior Gateway Protocol (i.e., IS-IS and/or OSPF) mechanisms to all other nodes in the IGP network domain (Segment Routing domain). The nodes select the definition for each algorithm based on the flooded information in a deterministic manner. In this way, all the participating nodes computing a particular Flexible Algorithm will arrive at a common understanding of the type of calculation that they need to use. Flexible Algorithm definition is generally based on minimization of a specified metric (i.e., delay, IGP metric, Traffic Engineering metric metric) and exclusion of links with certain properties (i.e., link-affinity, Shared Risk Link Group).

FIG. 1 illustrates a exemplary IGP domain 100 partitioned/segmented on the basis of Segment Routing (Flexible) algorithms. The exemplary IGP domain 100 comprises of nodes 0-9. Nodes 0 and 9 are enabled for Algorithm 0 which has a predefined definition corresponding to Shortest Path First (SPF) forwarding scheme based on IGP link metrics. As such node 0 and 9 advertise a Prefix SID 16000 and 16009 respectively to reflect their participation in Algorithm 0. The advertised Prefix-SIDs also represents the network reachability information. For example Prefix-SID 16000 represents network reachability information for node 0 and Prefix-SID 16009 represents the same for node 9. Two additional algorithm, namely Flexible-Algorithm 128 and 129, are also enabled for the network node in domain 100. Flexible Algorithm 128 with a user/operator provided definition, for example, to minimize IGP provided metric and avoid links with Traffic Engineering affinity RED is enabled on node 0, 9, 1, 2, 3 and 4 as shown in FIG. 1. Similarly Flexible algorithm 129 with a user/operator provided definition, for example, to minimize IGP provided metric and avoid links with Traffic Engineering affinity GREEN is enabled on node 0, 9, 5, 6, 7 and 8 as shown in FIG. 1. Each node may advertise a Prefix-SID for every forwarding algorithm enabled on it. By way of example Node 9 in FIG. 1 advertise Prefix-SIDs 16009, 16809 and 16909 for (Flexible)Algorithm 0, 128 and 129 respectively. On the other hand node 1 will only advertise a Prefix-SID 16001 for Algorithm 0 which is enabled by default on every node in the exemplary routing domain 100, and a Prefix-SID 16801 for Flexible algorithm 128. In the same way every node within the domain may advertise network reachability information for each (Flexible)Algorithm they support, as illustrated in FIG. 1. Consequently all network nodes become aware of reachability information for (Flexible) algorithms supported on every other network node in the domain.

Figure 2:
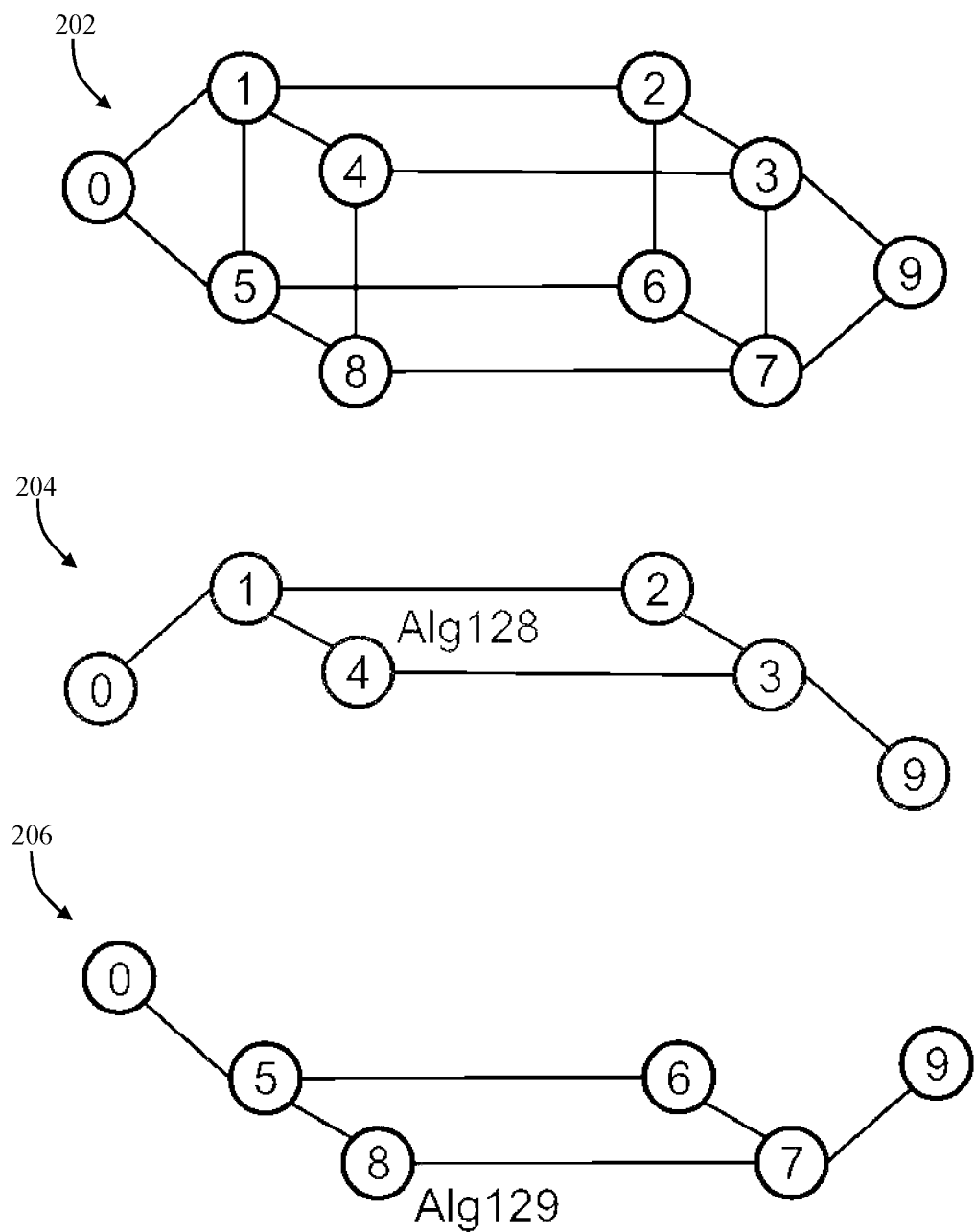
FIG. 2 illustrates different overlay network topologies corresponding to different Flexible-algorithms in accordance to some embodiment of the present technology.

A Prefix-SID, by virtue of being associated with a particular Flex-Algorithm, is also associated with a specific topology inherited from associated prefix reachability advertisement. In case of Flex-Algorithm the Prefix-SID (advertised for that Flex-Algorithm) is associated with forwarding paths computed, based on the Flex-Algorithm definition, in the associated topology. The associated topology corresponding to a particular Flex-Algorithm is determined by pruning any node that is not advertising participation for the Flex-Algorithm and furthermore pruning any link that is excluded by the definition of the Flex-algorithm. The associated topologies for the Flexible Algorithms 0, 128 and 129 are illustrated in FIG. 2. With reference to FIG. 2, topology 202 is associated with Algorithm 0, topology 204 is associated with Flexible Algorithm 128 and topology 206 is associated with Flex-Algorithm 129.

As stated before, a node computes (Flexible) Algorithm specific forwarding paths if it is enabled for the particular Flex-algorithm and has a consistent definition for the same. Flexible-Algorithm specific path (forwarding entries) corresponds to shortest-path tree on the associated topology, which is computed according to the definition advertised for that (Flexible) algorithm. These forwarding paths associated with each Prefix-SID of a particular Flexible-algorithm may then be installed in the forwarding plane (Forwarding Information Base) of network nodes (routers) participating in that Flexible-Algorithm. Therefore, in reference to the Segment Routing (SR) forwarding plane, the result of a flex algorithm computation is the provisioning of the corresponding Prefix SIDs with paths based on the computed topology for that algorithm. This flexible algorithm computation is within an Interior Gateway Protocol area similar to the default shortest path tree algorithm.

Flex-Algorithm are user defined, therefore a possibly exists for different users to use the same identifier (SID) for Flex-algorithms with different definitions resulting in dissemination of inconsistent information within the Segment Routing domain. In order to mitigate such a scenario wherein a Flex-Algorithm SID as advertised is associated with two or more dissimilar definitions within a SR domain, one or more central controllers or path computation Elements (PCE) may be provided for computing the associated topology and forwarding paths for each provisioned Flexible Algorithm and disseminating the same throughout the network.

In order for a controller/Path Computation Element (PCE) to learn the mapping of a Flex-Algorithm number/identifier to its definition in each area/domain of the underlying SRv6 domain, relevant information must be propagated/advertised across Segment Routing areas/domains. One mechanism to achieve this is by using Border Gateway Protocol—Link State (BGP-LS) which is an extension to the Border Gateway Protocol (BGP) for distributing the network's link-state (LS) topology and traffic engineering information to external entities, such as the Software Defined Network (SDN) controllers and/or Path Computation Elements. These components, while external to the network, require network state information on a real time basis. Specifically, they require link-state database information of each Interior Gateway Protocol node (OSPF, ISIS) in the entire network.

A network's link-state topology model (consisting of nodes and interconnecting links along with a set of attributes for each link) is distributed among routers using an Interior Gateway Protocol (i.e., OSPF, ISIS). As the network topology is discovered by the Interior Gateway Protocol, the changes are reflected in the BGP-LS model as well and are also distributed using BGP-LS messages to any interested party, such as SDN controllers or Path Computation Elements. SDN controller or the Path Computation Element also learn the type of computation and the constraints associated with each Flexible Algorithm. In this way, a controller or a Path Computation Element (PCE) is made aware of the Interior Gateway Protocol topology (including flexible algorithm related information) across multiple domains. The PCE may then use this information to set up end to end Segment Routing policy paths across domains by leveraging the appropriate Flex Algorithm specific Prefix SIDs in its Segment List.

Once flexible algorithm related information is disseminated throughout the segment routing domain(s), packets to be forwarded in accordance to a flexible algorithm (configured on a Segment Routing underlay node) are identified and tagged accordingly. Forwarding Information Base policies are then set along the way in accordance to the instructions/definitions provided for the flexible algorithm. For example, picking the Flex Algorithm Prefix-SID corresponding to a definition that optimizes on the delay metric enables the PCE/controller to build an end to end low latency path across IGP domains with minimal Prefix-SIDs in the SID list.

Therefore, Flexible Algorithms implemented in one location of the network maybe propagated via appropriates routing protocol(s) to other parts of the network. Accordingly, routers from separate locations in the network that are participating in a Flex-algorithm may install some form of Flex-Algorithm specific forwarding entries in their Forwarding Information Base. In this way appropriate traffic policing and Quality of Service (QoS) policies may then be created across Segment Routing domains based on the propagated information.

Forwarding paths computed for a specific Flex-Algorithm maybe used by a single application or alternatively by various applications, each potentially using its own dataplane for forwarding the data over such paths. Therefore, it would be possible to guarantee the presence of application-specific forwarding state associated with a particular Flex-Algorithm, by requiring network nodes to advertise their participation for a particular Flex-Algorithm for each application specifically.

Some aspect of the present technology are directed to implementation of several network slices with different requirements coexisting on top of the common network infrastructure. Diverse flows belonging to different network slices can be completely disjoint or can share different parts of the network infrastructure. In some embodiment native features of the Segment Routing with IPv6 data plane (SRv6) protocol such as Flexible Algorithms is used to address these requirements.

Figure 3:
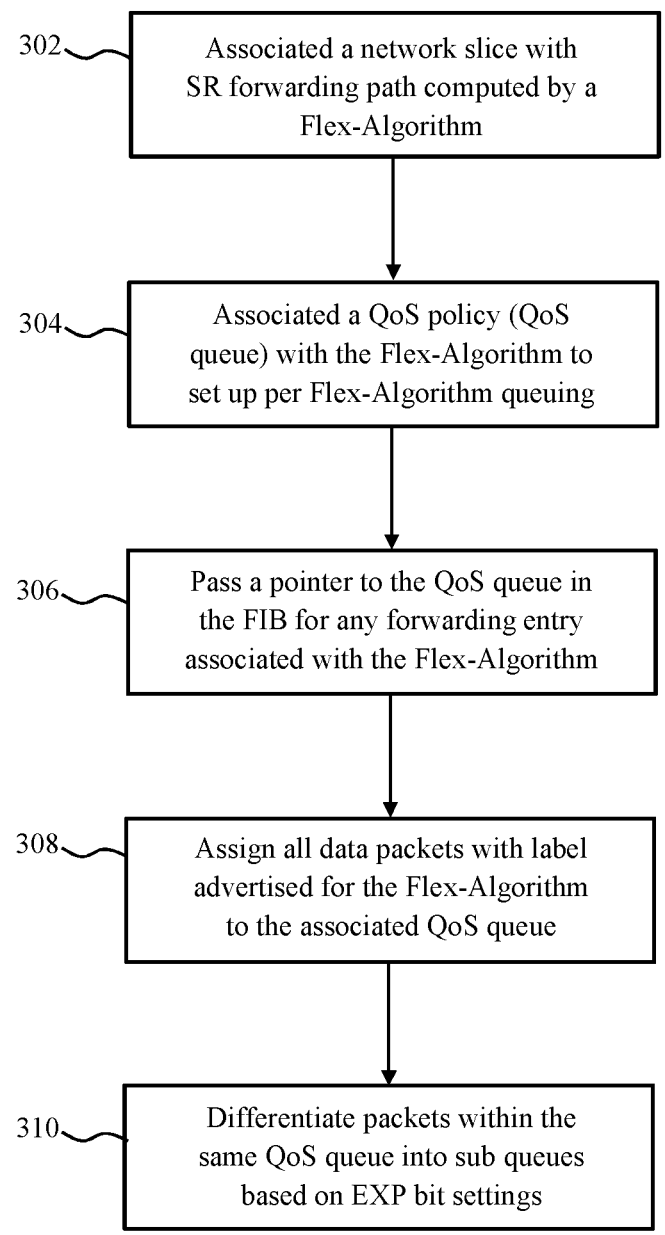
FIG. 3 illustrates an operational flow chart for implementing network slice based hierarchical queuing using Segment Routing Flexible Algorithms.

One of the primary motivations behind network slicing is that it may offer a platform wherein clients are charged based on their degree of network resource utilization i.e., size of their allocated network slice. Towards effective implementation of this requirement, embodiments of the present technology describe a highly scalable model for setting up network slice based Quality of Service (QoS) queuing mechanism in SRv6 underlay using Flexible-Algorithm feature of Segment Routing protocol. Such queues may be made to scale with respect to the size of the respective network slice (i.e., degree of network resource utilization) in such a way as to facilitate the network slice to grow or shrink based on the actual usage. Flow chart 300 in FIG. 3 describes an exemplary method for implementing per network slice queuing in SRv6 underlay according to some embodiment of the present technology.

With reference to flow chart 300, at step 302 Flexible-algorithm (definition may be locally defined or provided by controller or path computation entity) comprising of computed forwarding paths across participating network nodes is associated with a network slice. At step 304 Quality of Service policy queue(s) are created and associated with traffic routed according to the Flexible algorithm defined forwarding path. In this way per Flex-algorithm queuing which amounts to per network slice queuing is set up.

When a forwarding entry associated with a certain Flex-algorithm is made in a Forwarding Information Base (FIB) of a router, a corresponding pointer to the appropriate QoS queue may also be passed in the FIB for that particular forwarding entry. This action, which corresponds to step 306 of the example flow chart 300, ensures that QoS queues designated for a specific Flex-Algorithm are appropriately populated with the packets forwarded according to the forwarding policy of that specific Flex-algorithm. Therefore all data packets with label advertised for a specific Flex-Algorithm will be queued in the QoS queue associated with that Flex-Algorithm, as described in step 308.

Figure 4:
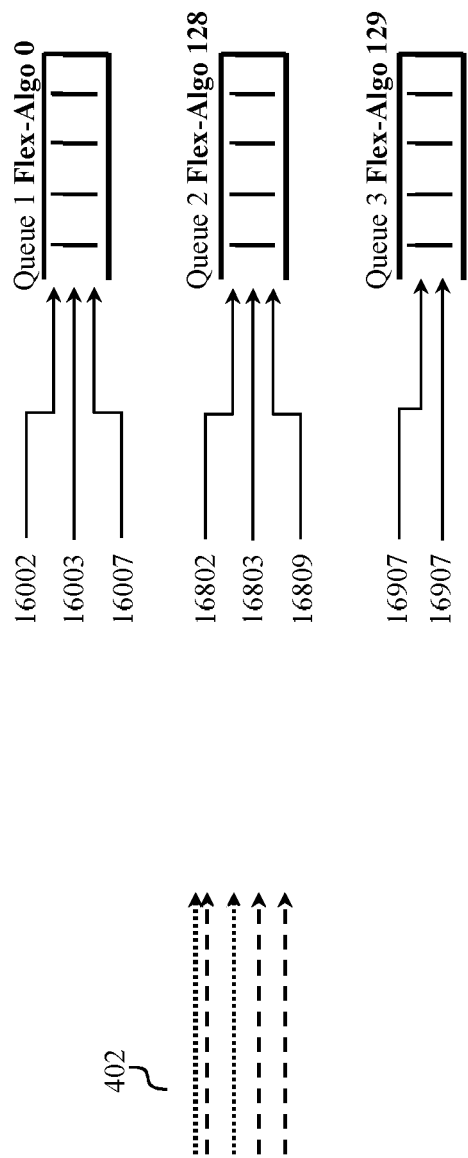
FIG. 4 illustrates a Flex-Algorithm based QoS queuing system in a pay as you grow system in accordance to some embodiments of the present technology.

This is further illustrated in FIG. 4, wherein an example (Flexible) Algorithm or network slice based queuing implementation 400 is provided. In the example queuing implementation 400 a set of diverse traffic flows (collectively denoted by 402) that are associated with various Prefix-SIDs in the Routing domain 100 in FIG. 1 are sorted into separate QoS queues based on the Flex-Algorithm with which they are associated. Consequently, all packets with a Prefix-SID label associated with Algorithm 0, Flex-Algorithm 128 and Flex-Algorithm 129 point, respectively, to Queue 1, 2 and 3.

Figure 5:
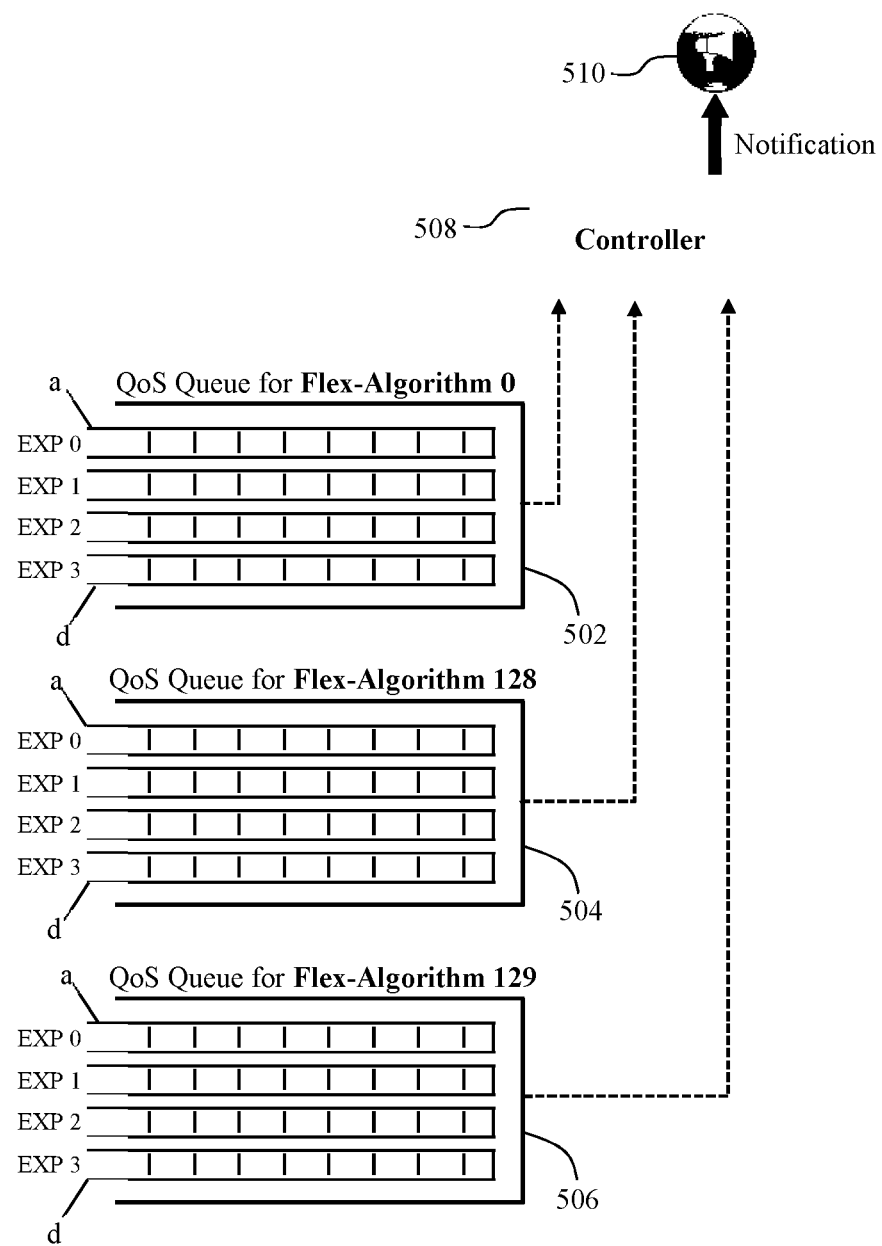
FIG. 5 illustrates hierarchical queuing based on Flexible-Algorithm provisioning and Experimental header bits designation to provide Queue-based service differentiation with greater degree of granularity.

Referring back to FIG. 3, the Slice based queues (implemented by following steps 302 to 308) may further be set up as hierarchical queues such that traffic within a network slice can get treatment based on the selected value of the experimental (EXP) bits. This action is described in step 310 of the example flow chart 300. Experimental (EXP) bits in the header may be used to define QoS treatment that a node should give to a packet. For example EXP bits may be used to encode the dropping precedence of packets during periods of congestion. By choosing different values for the EXP field critical packets may be marked so that those packets have priority if network congestion occurs. FIG. 5 illustrates hierarchical Network Slice based queuing as described by some embodiments of the present technology. QoS queues 502, 504 and 506 are respectively assigned to flows forwarded in accordance with (Flexible) Algorithms 0, 128 and 129. Each QoS queue (502, 504, 506) in FIG. 5 is further partitioned based on value of EXP bit into additional sub-queues a-d corresponding to EXP bit values of 0, 1, 2, 3 and 4.

According to some embodiments of the present technology, system and method for highly scalable implementation of network slice based traffic queuing for resource segmentation and partitioning in SRv6 underlay is provided that can facilitate a pay as you grow service model. In network slice based queuing, as described by some embodiments, queue depth may serve as an indicator of the degree of utilization of each slice and provide a greater insight into network resource utilization, with each customized network slice, to match the level of delivery complexity required by the supported services. This is illustrated in FIG. 5 where in controller entity 508 monitors the depth of per slice per EXP bit queues, According to one embodiment this may be accomplished by telemetering the queue depth value to the controller 508. The controller 508, may then run one or more analytic routines to determine if a network slice is running out of capacity. The outcome may then be provided as notifications 510 to the client utilizing the particular network slice to purchase additional network resources (i.e., bandwidth). Thus enabling a pay as you grow model to be implemented. Similarly notification 510 may also be utilized to prompt mobile network operator to purchase, for example, more bandwidth from the mobile infrastructure provider.

Resources for the network slices can be set up based on various service characteristics e.g. bandwidth demand, latency demand Beside the flexibilities provided by network slicing. The implementation of network slice based hierarchical queuing, as described by some embodiments of the present technology, enable Mobile Network Operators to efficiently analyze the operational cost and revenue generated from the respective slice by simply monitoring the depth of the packet queue(s) assigned to a particular network slice. According to the analysis, operators may allocate different network resource bundles to different slices, which makes the resource management much more structured, flexible, and efficient. As a result, the very same network can be utilized to seamlessly provide more and better services, i.e., generate more revenue without any increase in expenditure.

Furthermore, embodiments of the present technology provide a highly scalable queuing system and method in comparison with other queuing methodologies (i.e., Link State Protocol based queuing) which requires instantiation of a separate packet queue for each Prefix-SID associated with a network slice which is not a scalable solution. In contrast embodiments of the present technology prescribe a single queue per network slice, which may be set up as a hierarchical queue based on EXP bit values, or non-hierarchical queue differentiated only on the basis of associated forwarding Algorithm alone.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A computer-implemented method comprising:
associating one or more forwarding paths determined from one or more routing algorithms with respective network slices, each of the respective network slices having a specified Quality of Service requirement of respective applications;
assigning flow packets, associated with the one or more forwarding paths of with the respective network slices, to one or more of a plurality of queues based on the one or more routing algorithms, wherein each of the plurality of queues having one of the specified Quality of Service requirement;
pointing one or more forwarding entries, including at least one or more prefixes of the one or more routing algorithms, towards an associated one of the of the plurality of queues;
queuing the flow packets to the associated one of the plurality of queues based on the forwarding entries; and
differentiating packets within a same corresponding one of the plurality of queues into one or more sub-queues within the same corresponding one of the plurality of queues.

2. The computer-implemented method of claim 1, wherein the one or more routing algorithms include at least one Flexible Algorithm.

3. The computer-implemented method of claim 1, wherein the pointing of the one or more forwarding entries is implemented as Quality of Service propagation.

4. The computer-implemented method of claim 1, wherein a depth of the plurality of queues is monitored by one or more controller entities.

5. The computer-implemented method of claim 4, wherein the one or more controller entities are configured to provide notifications regarding the network slice based on the depth of the plurality of queues.

6. The computer-implemented method of claim 5, wherein the one or more controller entities include one or more path computation elements.

7. The computer-implemented method of claim 1, wherein the plurality of queues are provisioned on one or more network nodes configured for the one or more routing algorithms.

8. The computer-implemented method of claim 7, wherein each of the one or more routing algorithms correspond to a different network slice with specific performance characteristics.

9. The computer-implemented method of claim 1, wherein the plurality of queues include one or more bit-based sub queues and are implemented hierarchically to enable differentiation of the flow packets associated with each of the plurality of queues based on experimental bit values.

10. The computer-implemented method of claim 1, wherein the plurality of queues corresponding to the one or more routing algorithms are provisioned on one or more edge routers.

11. A non-transitory computer-readable storage medium comprising instructions stored therein which, when executed by one or more processors, cause the one or more processors to perform operations comprising:
   associating one or more forwarding paths determined from one or more routing algorithms with respective network slices, each of the respective network slices having a specified Quality of Service requirement of respective applications;
   assigning flow packets, associated with the one or more forwarding paths of the respective network slices, to one or more of a plurality of queues based on the one or more routing algorithms, wherein each of the plurality of queues having one of the specified Quality of Service requirement;
   pointing one or more forwarding entries, including at least one or more prefixes of the one or more routing algorithms, towards an associated one of the plurality of queues;
   queuing the flow packets to the associated one of the plurality of queues based on the forwarding entries; and
   differentiating packets within a same corresponding one of the plurality of queues into one or more sub-queues within the same corresponding one of the plurality of queues.

12. The non-transitory computer-readable storage medium of claim 11, wherein each of the plurality of queues include one or more bit-based sub queues and are implemented hierarchically to enable differentiation of the flow packets associated with each of the plurality of queues based on experimental bit values.

13. The non-transitory computer-readable storage medium of claim 11, wherein the one or more routing algorithms include Flexible Algorithms.

14. The non-transitory computer-readable storage medium of claim 11, wherein pointing the one or more forwarding entries is implemented as Quality of Service propagation.

15. The non-transitory computer-readable storage medium of claim 11, wherein a depth of the one or more queues is monitored by one or more controller entities.

16. The non-transitory computer-readable storage medium of claim 15, wherein the one or more controller entities are configured to provide notifications regarding the network slice, based on the depth of the plurality of queue.

17. The non-transitory computer-readable storage medium of claim 11, wherein the plurality of queues are provisioned on one or more network nodes configured for the one or more routing algorithms.

18. The non-transitory computer-readable storage medium of claim 17, wherein each of the one or more routing algorithms correspond to a different network slice with specific performance characteristics.

19. A system comprising:
   one or more processors; and
   a memory storing instructions which when executed by the one or more processors, cause the system to perform operations comprising:
   associating one or more forwarding paths determined from one or more routing algorithms with respective network slices, each of the respective network slices having a specified Quality of Service requirement of respective applications;
   assigning flow packets, associated with the one or more forwarding paths of the respective network slices, to one or more of a plurality of queues based on the one or more routing algorithms, wherein each of the plurality of queues having one of the specified Quality of Service requirement;
   pointing one or more forwarding entries, including at least one or more prefixes of the one or more routing algorithms, towards an associated one of the plurality of queues;
   queuing the flow packets to the associated one of the plurality of queues based on the forwarding entries; and
   differentiating packets within a same corresponding one of the plurality of queues into one or more sub-queues within the same corresponding one of the plurality of queues.

20. The system of claim 19, wherein pointing the one or more forwarding entries is implemented as Quality of Service propagation.

\* \* \* \* \*